May 8, 1923.
I. J. MARRIAGE
HEADER
Filed June 30, 1921
1,454,551
3 Sheets-Sheet 2
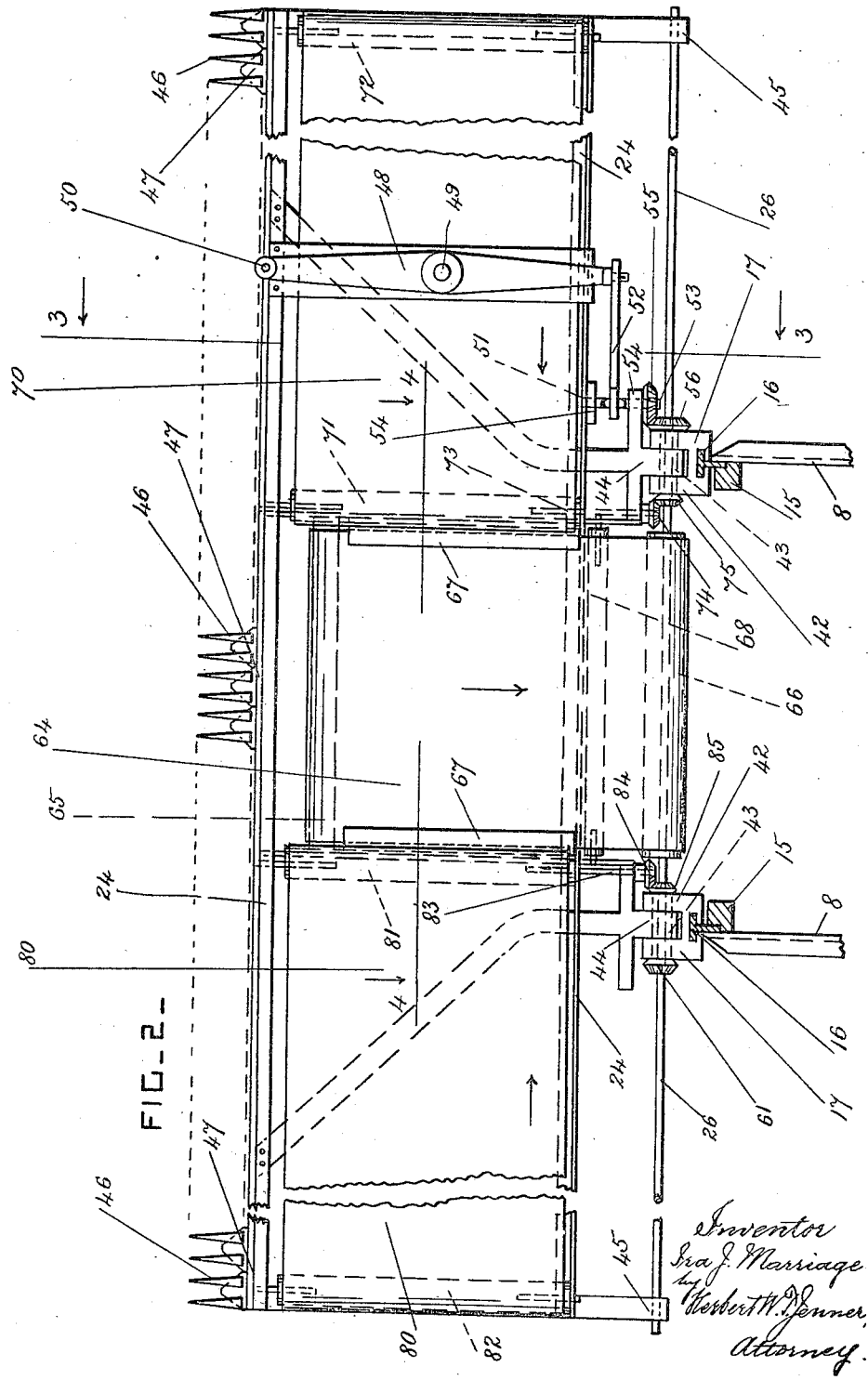

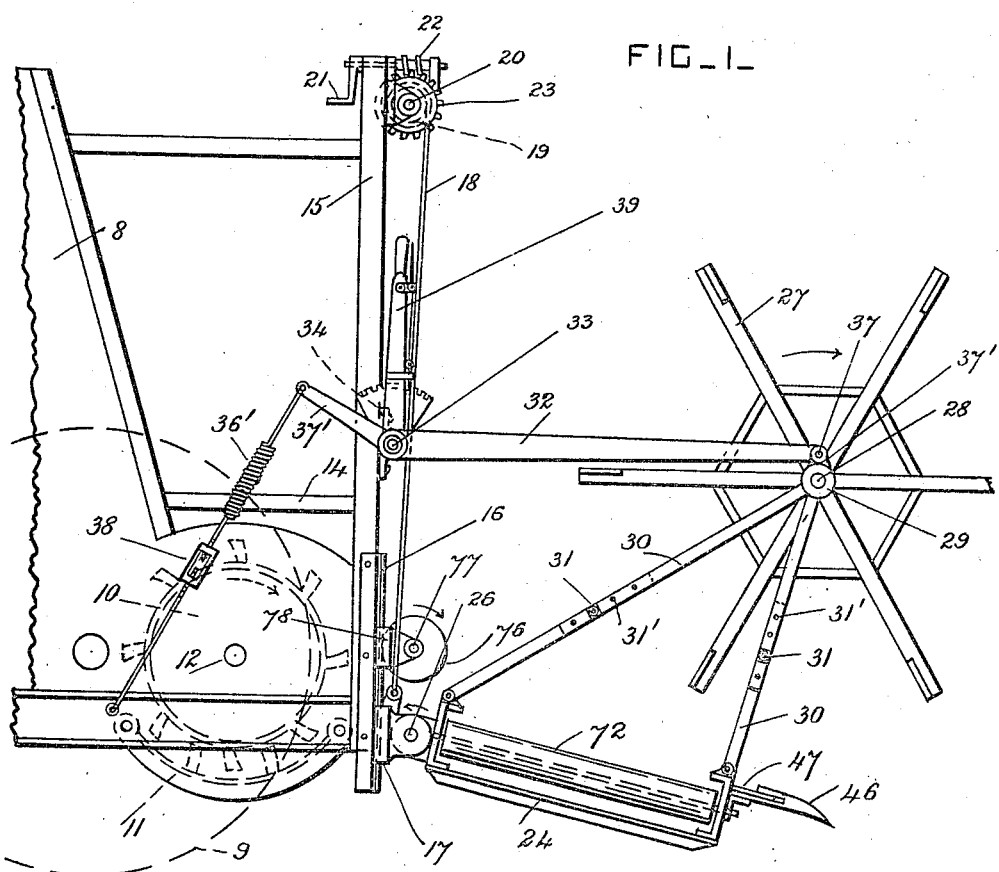

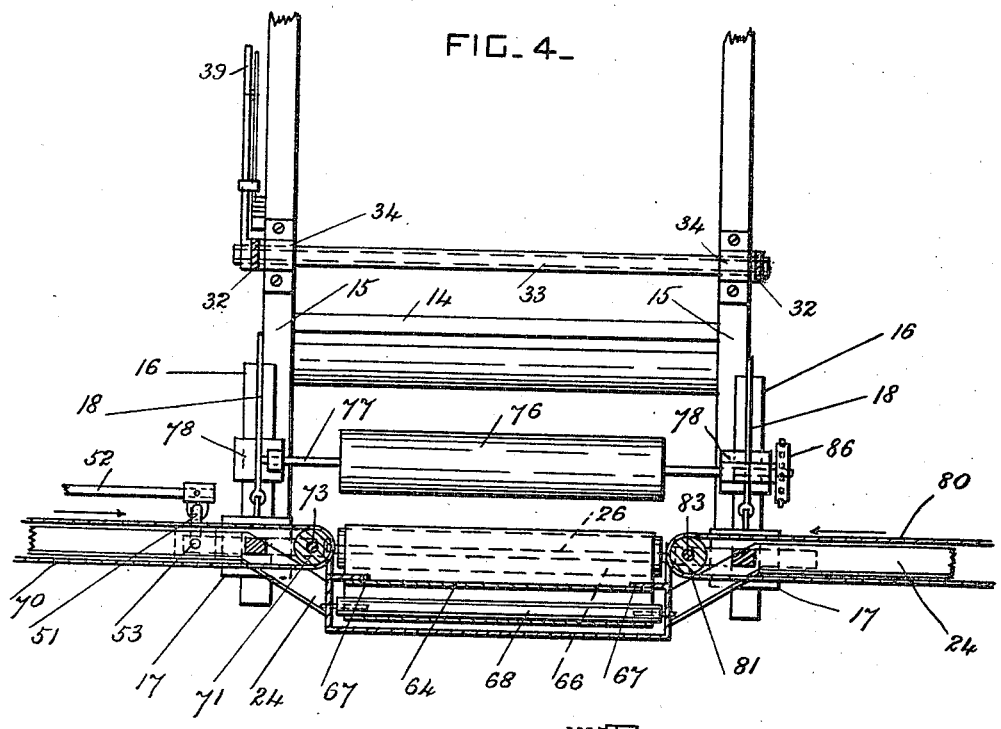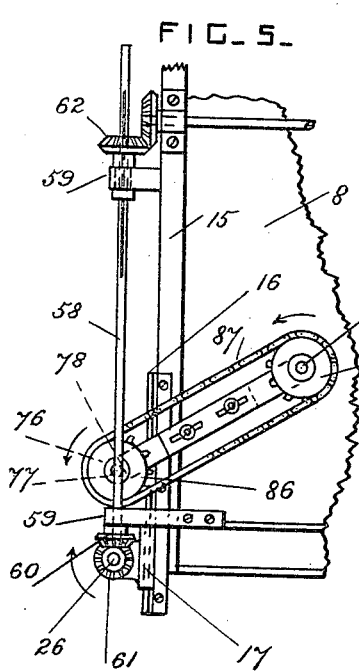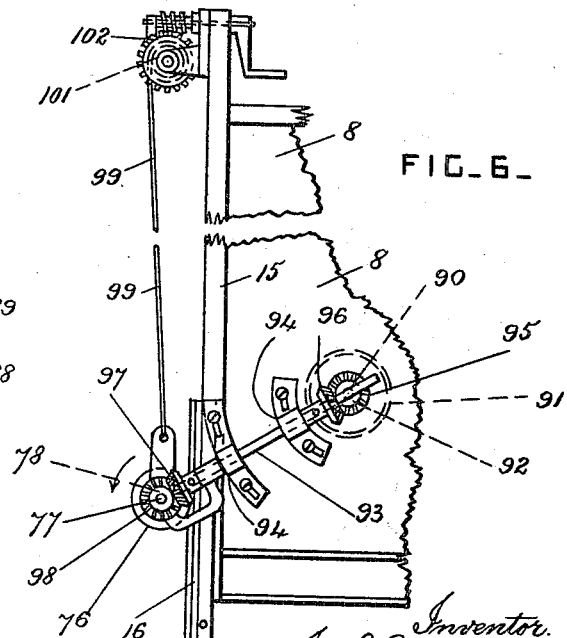

Patented May 8, 1923.

1,454,551

UNITED STATES PATENT OFFICE.

IRA J. MARRIAGE, OF WICHITA, KANSAS.

HEADER.

Application filed June 30, 1921. Serial No. 481,568.

*To all whom it may concern:*

Be it known that I, IRA J. MARRIAGE, a citizen of the United States, residing at Wichita, in the county of Sedgwick and State of Kansas, have invented certain new and useful Improvements in Headers, of which the following is a specification.

This invention relates to headers adapted to be attached to threshing machines and operated simultaneously with them for the purpose of harvesting grain; and it consists in the novel construction and combination of the parts hereinafter fully described and claimed whereby the cut heads received from the cutting mechanism are delivered directly to the threshing mechanism, and whereby the heading mechanism is supported, adjusted and operated.

In the drawings, Figure 1 is a side view, and Fig. 2 is a plan view, of a header constructed according to this invention. Certain parts are not shown in each figure for clearness. Fig. 3 is a section through the header frame, taken on the line 3—3 in Fig. 2. Fig. 4 is a similar section, taken on the line 4—4 in Fig. 2. Fig. 5 is a detail side view of the means for driving the header shaft and the feed roller. Fig. 6 is a side view showing a modification of the means for driving the feed roller.

The casing 8 of the threshing machine is supported on front ground wheels 9, and it forms a support for the header. The threshing cylinder 10, concave 11 and other parts of the threshing mechanism are arranged inside the casing, and are of any approved construction. The threshing cylinder is arranged as low as possible in the casing, and it is driven by the shaft 12. The platform 14 for the operator who runs the header is preferably arranged above the threshing cylinder.

The casing 8 is provided with uprights 15 at its front end, and 16 are guides secured to the uprights and arranged vertically, and one at each side of the machine.

Slides 17 for supporting the heading mechanism are slidable on the guides 16, and are adjustable vertically. Flexible connections 18 are attached at one end to the slides 17, and their other end portions are wound on a barrel or barrels 19 journaled at the upper parts of the uprights, and revolved by a shaft 20. The shaft 20 is revolved by hand by means of a crank-handle 21, and a worm 22 which gears into a worm wheel 23 secured on the shaft 20. The header frame 24 is pivoted to the slides 17 concentric with a driving shaft 26, hereinafter more fully described, and its rear end portion is raised and lowered with the slides 17.

A reel 27 of any approved construction is arranged over the front part of the header mechanism, and is secured upon a shaft 28 which is journaled in bearings 29 which are adjustably supported from the header frame by arms 30. The arms 30 are formed of overlapping sections which are secured together by bolts 31 which engage with any holes of a series of holes 31' formed in the said arms. The header mechanism is adjusted pivotally by means of arms 32 secured upon a rock-shaft 33, which is journaled in bearings 34 secured to the uprights 15 of the casing a little above the level of the reel shaft. The shaft 33 is preferably tubular for lightness, and it extends across the casing, and has an arm 32 secured on each end portion of it. The front ends of the arms 32 are pivotally connected with the reel shaft adjacent to the bearings 29 of the reel shaft by pins 37.

The pin 37 may be connected to links 37' pivoted to the reel shaft or to projections on the bearings 29 around the reel shaft; or the arms 32 may be connected loosely with the header frame in any other approved way, so that the header frame may be adjusted pivotally of the shaft 26.

Springs 36' are arranged between arms 37' secured to the rock-shaft 33, and the casing, and operate to balance the arms 32. These springs 36' have turnbuckles 38 for adjusting them. The rock-shaft 33 has a hand lever 39 for operating it, which is provided with any suitable catch for holding it in position, after the arms 32 have been adjusted. The front and rear parts of the header frame 24 are separately adjustable, so that it can be raised and lowered bodily, and set at various desired angles.

The slides 17 have forked bearings 42, and bearing sleeves 43 are secured in these bearings. The header frame 24 has arms 44 which are pivoted on the middle parts of the sleeves 43, and the header driving shaft 26 is journaled in the sleeves 43 and in bearings 45 which project from the end portions of the header frame. The header is provided with any approved cutting mechanism. A finger bar having fingers 46 is provided at the front of the frame 24, and a cutter bar 47 works in this finger bar. The cutter bar is reciprocated by a lever 48, the middle part of which is pivoted to the frame 24 by a pin 49. The front end of the lever 48 is pivoted to the cutter bar by a pin 50, and its rear end is connected to a crank 51 by a connecting-rod 52. The crank 51 is formed on a crankshaft 53 arranged longitudinally of the direction of travel of the header and journaled in bearings 54 on the header frame. One bearing 54 is shown formed on one of the arms 44 a little in front of the shaft 26, and the other bearing 54 is secured to the rear side of the header frame 24. When the crankshaft 53 is supported in this manner it permits the header frame to be raised and lowered bodily, and it also permits it to be moved pivotally of the shaft 26. Beveled toothed wheels 55 and 56 are secured on the crankshaft 53 and the driving shaft 26, and gear together so that the cutter bar is reciprocated.

In very wide headers, two similar levers 48 can be provided, and can each be connected with the cutter bar and the driving shaft in a similar manner, and can be pivoted one on each side of the center line of draft of the machine.

The header driving shaft 26 is revolved by any approved motor supported by the machine, and 58 is a vertical shaft which is slidable longitudinally in bearings 59 on the casing 8. A beveled toothed wheel 60 is secured on the lower end portion of the shaft 58, and gears into a beveled toothed wheel 61 secured on the shaft 26, or it may gear into the said wheel 56 which is secured on the shaft 26. A driving wheel 62 is splined to the shaft 58, and is driven by the motor, and the shaft 58 is slidable vertically in the hub of the wheel 62. The shaft 58 may be square instead of being provided with a spline, so that it is slidable and will be revolved by the wheel 62.

An endless central conveyer 64 is arranged longitudinally of the direction of travel of the header in front of the threshing cylinder, and is supported in the header frame 24 by a front roller 65 and a rear roller 66. The upper stretch of the conveyer is provided with horizontal guides 67 secured to the header frame, and the rear roller 66 is arranged above the level of these guides 67 and the front roller 65, so that the rear end portion of the upper stretch of the conveyer 64 is inclined upwardly and rearwardly. A guide roller 68 is journaled in the header frame, and the lower stretch of the conveyer 64 passes under this guide roller, so that it works clear of the upper stretch. The arrows on the drawings adjacent to the various movable parts indicate the direction of their motion.

The rear roller 66 of the conveyer 64 is secured upon the header driving shaft 26.

Endless travelling conveyers 70 and 80 are arranged one at each side of the central conveyer 64, and are driven in opposite directions and crosswise of its direction of motion. The conveyer 70 is supported by rollers 71 and 72 journaled in the header frame, and the shaft 73 of the roller 71 nearest the central conveyer is driven by intermeshing toothed wheels 74 and 75, secured respectively on the shaft 73 and on the header driving shaft 26.

The conveyer 80 is supported by rollers 81 and 82 journaled in the header frame, and the shaft 83 of the roller 81 nearest the central conveyer is driven by intermeshing beveled toothed wheels 84 and 85 from the header driving shaft 26.

The horizontal portion of the upper stretch of the central conveyer 64 is arranged below the level of the upper stretches of the two side conveyers 70 and 80.

A feed roller 76 is mounted on a shaft 77 which is journaled in bearings 78 supported by the casing 8. The bearings 78 may be adjustable vertically on the guides 16 if desired. The feed roller 76 is journaled over the rear roller 66 of the central conveyer. The two rollers 76 and 66 are arranged so that the material which passes between them is fed into the space between the threshing cylinder and its concave.

The feed roller 76 is revolved by any approved driving mechanism from the same motor that drives the heading mechanism. A sprocket wheel 86 is secured on the shaft 77, and is revolved by a drive chain 87 from a sprocket wheel 88 which is secured on a countershaft 89 and driven by the said motor.

The feed roller 76 may however be driven by beveled toothed gearing, if desired, as shown in Fig. 6. A countershaft 90 is driven from the motor by a belt pulley 91, and is journaled in bearings 92. A longitudinal shaft 93 is journaled in bearings 94, and is connected with the countershaft by intermeshing beveled toothed wheels 95 and 96, and the shaft 93 is connected with the shaft 77 of the feed roller 76 by intermeshing beveled toothed wheels 97 and 98. When the feed roller is not supported in bearings secured to the guides 16, it is adjustable circumferentially of its countershaft, and is supported from the casing by any approved means, such as flexible connections 99. Flexible connections 99 are attached to the said bearings 78, and are wound on a barrel 101 provided with winding mechanism 102, and supported by the casing 8.

The machine is moved longitudinally into the crop by any approved power, and the cutter bar is reciprocated to cut the heads of the crop. The reel throws the cut heads onto the three conveyers, and the side conveyers deliver the heads thrown onto them to the central conveyer. The central conveyer and the feed roller feed all the cut heads to the threshing cylinder and its concave, which separate the grain from the heads.

What I claim is:

1. The combination, with the casing of a threshing machine, and vertical guides secured at the front end thereof; of slides engaging with the said guides, a header frame pivoted to the said slides and having cutting mechanism at its front part, adjusting mechanism for sliding the said slides simultaneously, means for supporting the front part of the header frame from the said casing and adjusting it pivotally and independently of the vertical adjustment of the said slides, and an endless conveyer mounted in the header frame and adjustable vertically and pivotally with it and operating to discharge the cut heads into the said casing.

2. The combination, with the casing of a threshing machine, and vertical guides secured at the front end thereof; of slides engaging with the said guides, a header frame pivoted to the said slides and having cutting mechanism at its front part, adjusting mechanism for sliding the said slides simultaneously, supporting arms pivoted to the said casing above the said guides and having their free front ends operatively connected with the header frame, means for operating the said arms simultaneously to adjust the header frame pivotally and independently of the vertical adjustment of the said slides, and an endless conveyer mounted in the header frame and adjustable vertically and pivotally with it and operating to discharge the cut heads into the said casing.

3. The combination, with the casing of a threshing machine, and vertical guides secured at the front end thereof; of slides engaging with the said guides, a header frame connected to the said slides and having cutting mechanism at its front part, adjusting mechanism for sliding the said slides simultaneously, an endless conveyer mounted in the header frame and adjustable vertically with it and operating to discharge the cut heads into the said casing, a feed roller supported by the said casing and arranged over the rear portion of the said conveyer, and means for adjusting the position of the said feed roller vertically and independently of the vertical adjustment of the said conveyer.

4. The combination, with the casing of a threshing machine, and vertical guides secured at the front end thereof; of slides engaging with the said guides, a header frame pivoted to the said slides and having cutting mechanism at its front part, adjusting mechanism for sliding the said slides simultaneously, a header driving shaft journaled in the said slides concentric with the header pivots and operatively connected with the said cutting mechanism, means for supporting the front part of the header frame from the said casing and adjusting it pivotally, and an endless conveyer mounted in the header frame and provided with a driving roller secured on the header driving shaft between the said slides.

5. The combination, with the casing of a threshing machine, of shaft bearings supported by the said casing, a header frame pivoted to the said bearings and having cutting mechanism at its front part, a header driving shaft journaled in the said bearings concentric with the header frame pivots and operatively connected with the said cutting mechanism, means for supporting the front part of the header frame from the said casing and adjusting it pivotally, a central endless conveyer mounted in the header frame and provided with a driving roller secured on the header driving shaft between the said bearings, transverse conveyers arranged in the header frame one on each side of the central conveyer and delivering cut heads onto it, and driving mechanism operatively connecting the said transverse conveyers with the said header driving shaft.

6. The combination, with the casing of a threshing machine, of shaft bearings supported by the said casing, a header frame pivoted to the said bearings and having cutting mechanism at its front part, a header driving shaft journaled in the said bearings concentric with the header frame pivots, a crankshaft journaled in the header frame, beveled toothed wheels which drive the said crankshaft from the said header driving shaft, driving mechanism operatively connecting the said crankshaft with the said cutting mechanism, means for supporting the front part of the header frame from the said casing and adjusting it pivotally, and an endless conveyer mounted in the header frame and provided with a driving roller secured on the header driving shaft between the said shaft bearings.

7. The combination, with the casing of a threshing machine, of shaft bearings supported by the said casing, a header frame pivoted to the said bearings and having cutting mechanism at its front part, a header driving shaft journaled in the said bearings concentric with the header frame pivots and operatively connected with the said cutting mechanism, means for supporting the front part of the header frame from the said casing and adjusting it pivotally, an endless conveyer mounted in the header frame and having its rear portion arranged at an angle to its main portion and provided with a driving roller which is secured on the header driving shaft between the said shaft bearings, and guides on the header frame which constrain the main portion of the upper stretch of the said conveyer to work out of line with its rear portion.

8. A support, forked bearings carried by the support, bearing sleeves secured in the forked bearings, a header driving shaft journaled in the said sleeves, a header frame provided with arms which are pivoted on the middle parts of the said sleeves, cutting mechanism carried by the header frame, an endless conveyer provided with a driving roller which is secured on the said shaft, and driving devices for operating the cutting mechanism from the said shaft.

In testimony whereof I have affixed my signature.

IRA J. MARRIAGE.